United States Patent
Artmann

[15] 3,661,604
[45] May 9, 1972

[54] LIGHT-WEIGHT CONCRETE MATERIAL AND PROCESS FOR PRODUCING THE SAME

[72] Inventor: Paul Artmann, Maxingstrasse 38, Wien 13, Austria

[22] Filed: Aug. 12, 1969

[21] Appl. No.: 849,345

[30] Foreign Application Priority Data

June 3, 1969 Austria .......................... A 5320/69

[52] U.S. Cl. ............................................. 106/98, 106/97
[51] Int. Cl. ........................................................ C04b 31/20
[58] Field of Search ................................ 106/89, 97, 98

[56] References Cited

UNITED STATES PATENTS

| | | | |
|---|---|---|---|
| 3,389,003 | 6/1968 | Gado | 106/89 |
| 3,147,126 | 9/1964 | Smothers | 106/97 |
| 2,880,100 | 3/1959 | Ulfstedt | 106/89 |
| 2,542,992 | 2/1951 | Clapper | 106/97 |

OTHER PUBLICATIONS

Zea & Desch; " The Chemistry of Cement and Concrete," Edw. Arnold & Sons Ltd., pp. 483– 486 and 597 (1956)

Taylor, W. H.; " Concrete Technology and Practice," American Elsevier, pp. 50, 61, 116– 118, 278, 335– 336, 410, 462 (1965)

Primary Examiner—Tobias E. Levow
Assistant Examiner—W. T. Scott
Attorney—Waters, Roditi, Schwartz & Nissen

[57] ABSTRACT

A light-weight concrete having a density of 800 – 1,800 kg/m$^3$ consists essentially of a coarse aggregate, a fine aggregate, cement, and water, the coarse aggregate being at least 50 percent of all solids by volume, the fine aggregates being constituted by fine said of less than 1 mm grain size, crushed mineral material such as crushed brick of less than 5 mm grain size and pulverized mineral material, such as powdered brick of a grain size of less than 2 mm.

1 Claim, 3 Drawing Figures

LIGHT-WEIGHT CONCRETE MATERIAL AND PROCESS FOR PRODUCING THE SAME

SUMMARY OF THE INVENTION

The invention relates to a light-weight building material, and more particularly to a light-weight concrete having a density of 800 – 1,800 kg/m³ and preferably 1,200 – 1,600 kg/m³, the concrete consisting of a coarse aggregate of discrete nature; a fine aggregate (fines), such as sand, pulverized and/or crushed mineral or ceramic material; and a hydraulic binder, such as Portland cement, the amount of the coarse aggregate representing at least one-half by volume of the concrete.

An object of the invention consists in developing a light-weight building material, possessing good strength characteristics and being compatible with steel reinforcement, so that it may be used for load-bearing structural members. The light-weight building material according to the invention, which, in addition to its high bearing strength, possesses pronounced insulating capability, and good mechanical properties. In this respect, despite its light weight, the concrete has high compression and tensile strength, and especially high flexural tensile strength, and it attains compression strength values of at least 160 kg/cm² within 7 days of casting and is suitable for pre-stressing. In addition to its high thermal insulating and heat retaining capabilities the concrete is condensation-free and meets all building requirements while being nailable and chiselable without risk of chipping, and presenting all other advantages of conventional light-weight building materials, without, however, possessing any of their known undesirable disadvantages.

It was found, that all these objectives of the invention, as well as numerous further valuable and surprising technical advantages can, in accordance with the essential characteristic of the invention, be achieved by the presence in the concrete mix of fines consisting of fine sand of 0 – 1 mm grain size (caliber), a crushed mineral material of 0 – 5 mm grain size, especially crushed brick, and a pulverized mineral material of 0 – 2 mm grain size, especially powdered brick or brick flour.

A light-weight building material so constituted, permits realizing, in comparison to heavy concrete of identical strength, weight economies of the order of 30 to 60 percent, and yet, this material, on the other hand, in spite of a high compression strength of the order of 160 – 500 kg/cm² attained within 7 days, has excellent thermal insulation properties, possesses low heat conductivity in all strength ranges, and, even at the highest strengths, it can be fabricated with ease and displays no brittleness. The light weight of the high-strength building material, for example, only 1,800 kg/m³ with a compression strength after 7 days of 500 kg/cm² — naturally offers a whole series of important practical advantages: the volume of the structural elements made of this material is reduced to a most desirable minimum and the costs of the foundation are reduced in accordance with the reduction of the dead loads. With the light-weight building material, it becomes possible (for identical cross-sectional dimensions) to attain considerably greater span lengths, and the transportation of prefabricated building elements is simplified on account of the reduced weight of the pieces; the equipment needed for transportation and handling can also be of reduced capacity.

Of particular importance is the content of pulverized mineral material, or the preferred brick flour; this content shall be at least 10 percent of the total volume. According to a preferred embodiment of the invention, the amount of fine sand, crushed brick and brick flour of the fines are approximately equal, i.e., by volume each representing about one-third of the total fines volume; it has been demonstrated that a light-weight building material of this composition brings optimum results. The amount of the coarse aggregates, preferably bloated clay aggregate, is 60 to 75 volume percent for high-strength material.

Actually, my most extensive experimental series have confirmed, that this composition not only permits optimum achievement of all the aforementioned objectives of the invention, but additionally, a building material of this composition has brought about the following unexpected effects, of considerable practical value.

The light-weight building material is particularly suitable for fabrication and forming in a sliding type mold casing, where in particular, the sliding performance is considerably increased to about three and one-half times the conventional rate. On the one hand, the light-weight building material acquires shape stability very rapidly, so that the mold casing can be lifted soon and without additional facilitating means, such as lubrication, for example, after about 2 ½ hours. On the other hand, the light-weight building material remains moldable and smoothable for an extraordinarily long period after mold release, namely up to 16 hours after its introduction into the mold casing. Regardless of this, however, the light-weight building material of the invention can be well fabricated even after it has set, i.e., it can be chiselled, drilled, nailed and screwed without any risk of chipping. It is recommended, that the external surfaces, after accelerated hardening and completed evaporation be maintained moistened for at least 24 hours. In this manner, shrinkage cracks can be avoided.

Another unexpected and highly valuable effect manifests itself in the compaction of the light-weight material charged into the mold, by tamping. Even with high-frequency vibration, no disintegration of the mixture occurs, regardless of the nature of the coarse aggregates; and this is attributed to the composition of the fines components of the light-weight building material. The vibrating compaction is carried out as briefly as possible by means of immersion type vibrators, or vibratory tables. The most suitable consistency of the mix is that in which a hole, remaining upon withdrawal of an immersion type vibrator, will close gradually without becoming filled with water.

The coarse aggregates within the scope of the invention are coarse materials of all kinds of a size exceeding 3.0 mm; specifically suitable, however are granulated bloated clay, blast furnace slag, scoria, flue dust clinker etc., i.e., granulated materials having a glassy, porous, sintered surface.

The required amount of bloated clay aggregate for one cubic meter of finished concrete, depending upon the desired strength values to be realized, is 700 to 1,000 liters, and in mesh sizes of 5 to 10 mm, or 10 to 20 mm, respectively, in which grading the contents of smaller, or larger grains has an approximate ratio of 4 to 1. For the 5 to 10 mm mesh sizes, the oversized material may amount to a maximum of 10 percent, for the 10 to 20 mm mesh sizes to a maximum of only 5 percent. The amount of bloated clay for insulating concrete amounts to about 65 to 75 percent; specifically high load bearing concretes are made with approximately 50 to 60 percent of bloated clay.

The cement ingredient, again depending upon the strength values to be realized in the light-weight building material, is 250 to 360 kg/m³ of finished concrete, and the corresponding amount of water is about 170 to 180 liters. Accordingly, there result surprisingly low water-cement ratios of a maximum of between 0.4 to 0.6. This advantageous feature probably results from the fact, that the mix proportioning of the fines according to the invention assures a particularly harmonic interaction, in which the brick flour, or equivalent component, is particularly favorable to the production of an intimate bond and a mortar structure of extraordinary density. This is also evidenced by the fact, that, when breaking up the hardened light-weight building material, it is found that the coarse components themselves are broken without being released from the stratum of the mortar.

The amount of ground mineral material, for concrete mixes of pronounced load-bearing strength is less than 10 percent by volume of the total aggregate, whereas for material serving primarily for insulating purposes it is below 5 percent.

Contrary to the interdependence conventionally existing between the specific gravity of a building material and its noise insulating capability, the light-weight building material according to the invention, on account of the sound absorption capability of its finely porous aggregates, especially of the bloated clay, will result in satisfactory noise insulation in spite of the low specific gravity and reduced wall thickness. Apartment partition walls of 14 cm wall thickness are sufficient for assuring a satisfactory soundproofing.

The thermal insulating capability, as will be shown later on the basis of examples of practical realizations, is excellent. On account of the higher inner-wall-surface temperature a so called bunker climate in the wall-enclosed space is avoided. The heating costs, in comparison to walls of equal thickness constituted with convention materials, are reduced between 30 and 50 percent.

The light-weight building material according to the invention, moreover, is compatible with reinforcing steel in an extraordinary manner, the composite effect between the material and its reinforcement being as good as in heavy concrete.

Since the light-weight building material, on the other hand, possesses reduced weight in spite of its high compression strength, it is possible to attain considerably greater span lengths with identical cross-sections, so that the volume of the structural members required for a building design is a minimum.

Quite surprising and novel, however, is the behavior of the light-weight building material of the invention under heat, such as for example, if a building part is exposed to the action of a flame on one side. On account of the high insulating property of the material, a flame-exposure on one side even of very long duration will not result in burning of the reinforcement, if the same is covered to the usual extent by the mass of the building material. Regardless, the light-weight building material also possesses great fire resistance inasmuch as, although it is deformed under the action of heat, this deformation is elastic and the material will later fully return to its original shape.

The following is an example. a column made of the light-weight building material of the invention being dimensions of 14 × 70 × 280 cm in non-heated state carried a breaking load of 236 tons. Such a column was exposed to a flame at a temperature of 1,500° C. against one of its broad sides for 3 hours. On the opposite side, the column attained a maximum temperature of only 80° C. during this time, which is well below the limit temperature permitted for highly fire-proof building materials. The load-bearing capacity of the column, after this heating still amounted to 140 tons, i.e., it was reduced only by about 40 percent through this extraordinarily high heat application.

On account of the purely one-sided heat expansion, the column deformed into arc shape, however, after temperature reduction it gradually returned to its original straight shape.

On the flame attacked side, the surface became somewhat chamot-like, the surface temperature rises only insignificantly and remains far below the permissible maximum value.

It goes without saying, that the light-weight building material according to the invention can be utilized, not only in structural elements consisting integrally and homogenously of such material, but this material can also be used in combination with other materials in so called composite building elements, and in particular, this material, on account of its excellent strength values and its low density structure can be used to great advantage as a supporting body for insulating layers, barrier layers and finish facings of various kinds.

BRIEF DESCRIPTION OF THE DRAWING

Variations of embodiments of prefabricated elements, which can be produced by utilization of the material of the invention, will be discussed hereafter in connection with the appended drawings.

DETAILED DESCRIPTION

Figure 1:
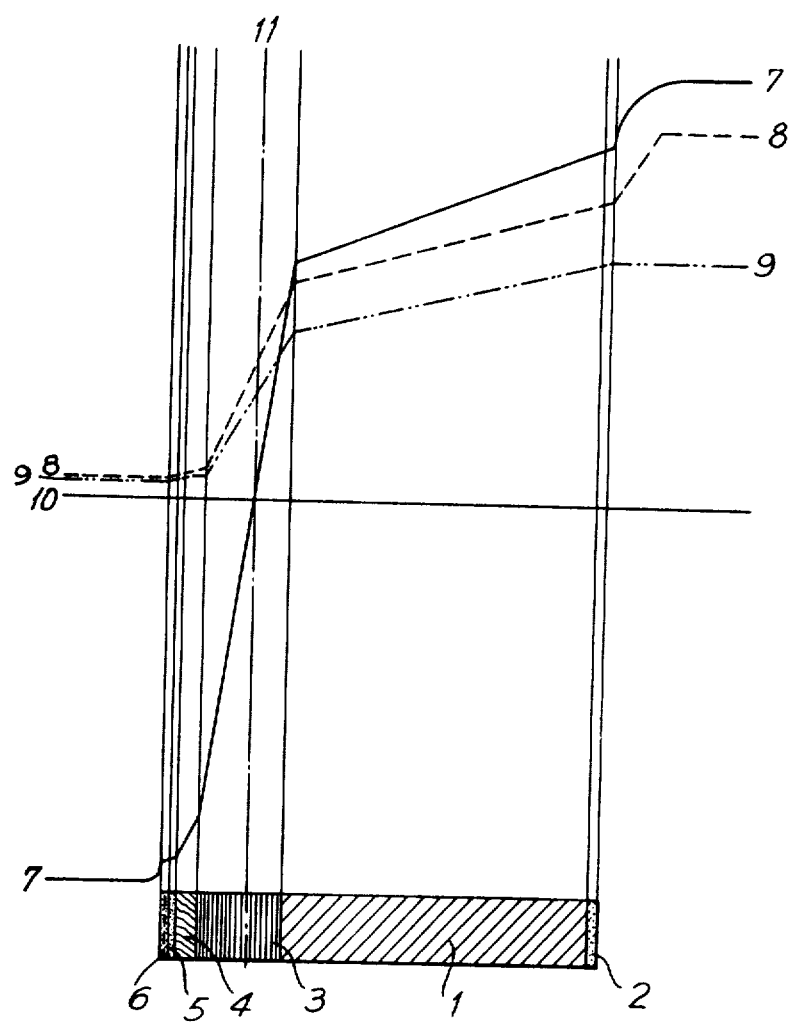
FIG. 1 is a section through a composite element having a supporting body of the material of the invention, there also being shown graphical representations of various characteristics of the supporting body.

FIG. 1 shows a solid supporting body 1 consisting of the building material of the invention (light-weight concrete) of approximately 14.5 cm thickness, the mix of which contains crushed brick and brick flour. On the inner surface of body 1 is a plaster-lime-mortar layer 2 of about 0.3 cm thickness. The outside surface is covered by insulting layers, or boards, respectively, in a sequence from inside to outside consisting of a 4 cm thick layer 3 of foamed resin, a 1.0 thick wood-fiber board 4, a 0.3 cm thick layer of cement mortar, serving to seal the pores of the wood-fiber board, and, finally, a 0.3 cm thick layer of a glass-fiber fabric insert imbedded in a bonding base of cement-resin mortar and a finish facing of quartz sand-cement-resin-mortar.

Line 7 in FIG. 1 shows the thermal gradient of this composite plate on the basis of an outside temperature of −18°C. and an inside temperature of +20° C. Line 8 shows the curve of the water-vapor saturation pressure, which rises from a value of 0.94 mm Hg on the outside to a value of 17.540 mm Hg on the inside. Line 9 represents the curve of the water-vapor component pressure, the gradient of which runs between 0.80 mm Hg outside and 11.400 mm Hg inside. 10 designates the temperature null-line and 11 the freeze limit inside the composite plate.

In the experiment, upon which these results are based, there prevailed a relative humidity of the atmosphere of 85 percent outside, and 65 percent inside; the heat convection constants amounted to 30 outside and to 7 inside; the resistivity to heat amounted to 1.6642 $m^2h°$ C./kcal; the heat transfer coefficient $k$ accordingly was 0.8008 k cal/$m^2h°$ C. and the heat transfer $D$ = 1.4881 $m^2h°$ C./kcal. The heat storage coefficient $w$ was 43.8283 kcal/$m^{2o}$C., the coolout period $z$ = 72.95 hours, and the half-valve period was 38.74 hours.

The heat loss with this composite plate is only 547.93 kcal/$m^2$ which is far below the permissible maximum, and the vapor permeation resistance is 44.306 $m^2$hmmHg.

As far as heat conservation is concerned, a full brick wall of 48.75 cm thickness would be equal to this composite plate, and with regard to thermal insulation, such a wall of 78.95 cm thickness is required.

Since the vapor component pressures in the individual wall layers are always lower than the vapor saturation pressures, the entire wall remains free of water condensation, so that it is most satisfactory from the view point of diffusion technology and building requirement. There is no falling below the dew point at any location of the internal wall structure, so that any exudations of moisture on the inside of the wall are avoided. Moreover, there result very short heat-up periods for the rooms enclosed by these walls, with corresponding economy of heating costs; there is a feeling of comfort even when sitting in the immediate vicinity of the inner side of the wall. The building humidity is also limited to a most desirable minimum, since the water-to-cement ratio of the building material forming the support body can be held very low, amounting only to about 0.4 to 0.6.

Figure 2:
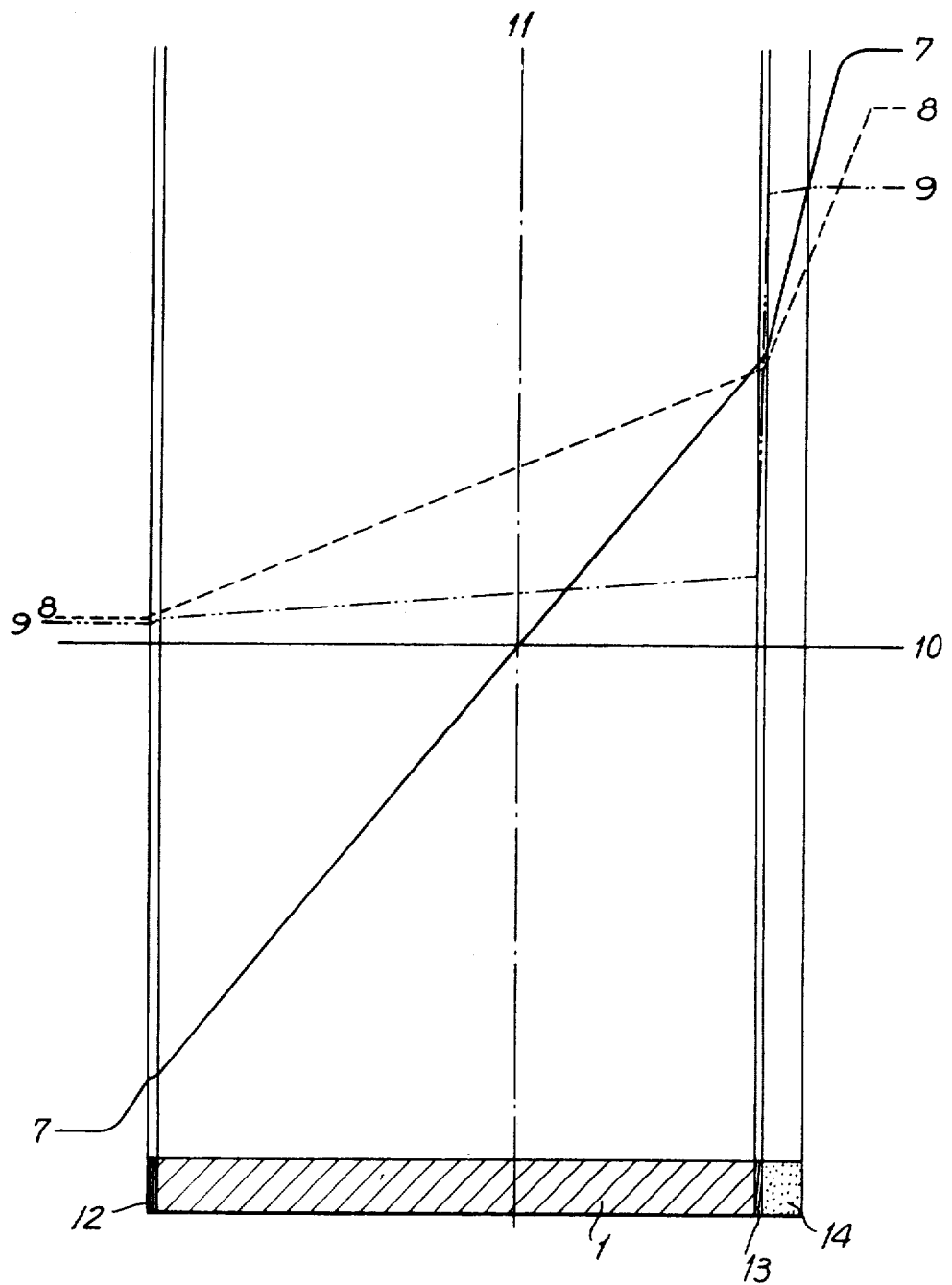
FIG. 2 is similar to FIG. 1 and shows a section through an element consisting substantially of said material.

The example of the composition of a building plate on the basis of FIG. 2 will next be explained, in order to demonstrate, that the building material of the invention is also suitable for the production of substantially homogenous bodies.

The solid support body 1 of light-weight building material, according to the invention, has a thickness of 22 cm and a specific gravity of only 1,200 kg/$m^3$, however, it develops a compression strength of 180 kg/$cm^2$ after 24 hours. The body carries on its outer side a finish facing 12, of quartz sand-resin with glass-fiber reinforcement, with a thickness of about 3 mm, and on its inner side body 1 has a double asphalt coating 13 of 2 mm thickness, as well as an inside facing of vermiculite of a thickness of 1.5 cm. mm Hg Line 7 of the diagram again shows the thermal insulation capability of this plate on the basis of a temperature gradient between an outside temperature of −18° C. and an inside temperature of +22° C. Line 8 shows a curve of the water-vapor saturation pressure, which rises from a value of 0.93 mm Hg on the outside to a value of 19.830 mm Hg on the inside. Line 9 represents the curve of the water-vapor component pressure, the gradient of which extends from 0.84 mm Hg outside to 2.58 mm Hg inside. 10 designates the temperature null line and 11 the freeze limit inside the plate.

In this experiment, the heat transfer coefficient was $k = 0.93977$ and the heat transfer $D = 1.06409 \, m^2 h° \, C/kcal$. The heat loss per square meter of full wall surface is $Q = 37.60 \, kcal/hm^2$.

Relative to heat retention, this composite plate corresponds to a full brick wall of 33.75 cm thickness, and relative to thermal insulation to a full brick wall of 56.63 cm thickness. The cool-out period $z = 36.77$ hours, and the half-value period was 18.57 hours.

Figure 3:
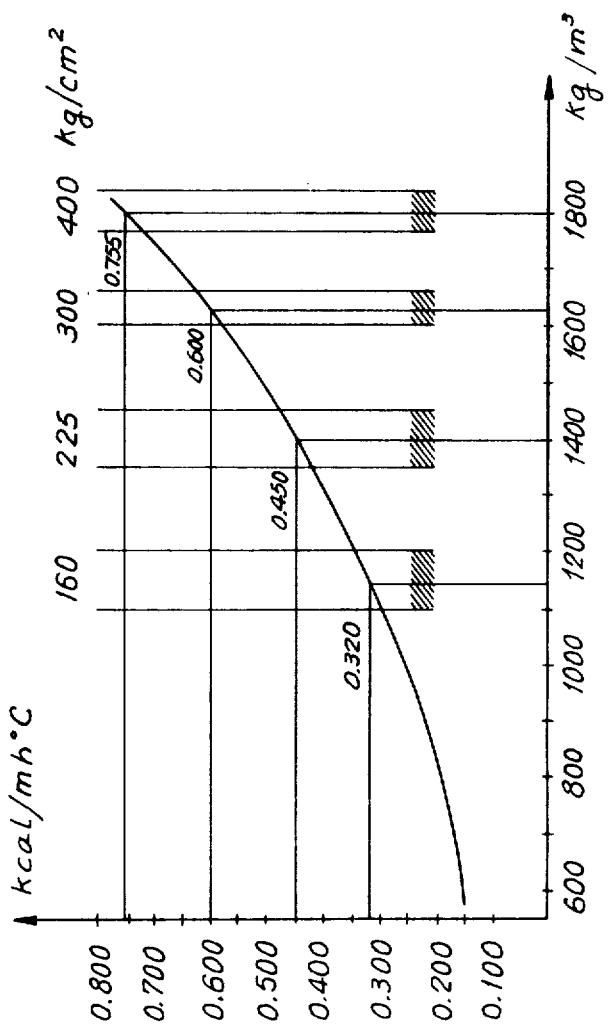
FIG. 3 is a graphical representation showing the material properties for various mix ratios.

FIG. 3 of the drawing represents a graph of the values of the heat transfer coefficients in $kcal/mh°C$. for different specific gravities ($kg/m^3$) of a building material according to the invention.

Determination of these values was made under a humidity of 6 volume percent, the stray areas are indicated by hatching for individual concrete grades, i.e. for commercial concrete grades attaining strengths of 160, 225, 300 and 400 $kg/cm^2$ after 7 days.

The basic mixes for the individual concrete grades are given by way of example in the following tabulation:

Basic mixes for the individual concrete qualities:

| Concrete quality | | B160ˣ | B160 | B225 | B300 | B400 |
|---|---|---|---|---|---|---|
| Portland Cement | kg/m³ | 309 | 295 | 325 | 330 | 350 |
| Sand 0–1 mm. | l/m³ | 162 | 243 | 289 | 340 | 370 |
| Crushed brick 0–2 mm. | l/m³ | 110 | 116 | 109 | 118 | 132 |
| Crushed brick 2–5 mm. | l/m³ | 70 | 100 | 135 | 132 | 158 |
| Bloated clay 5–10 mm. medium strength | l/m³ | 810 | 729 | 650 | — | — |
| Bloated clay –20 mm. medium strength | l/m³ | 201 | 162 | 162 | — | — |
| Bloated clay 5–10 mm. high strength | l/m³ | — | — | — | 574 | 528 |
| Bloated clay 10–20 mm. high strength | l/m³ | — | — | — | 146 | 132 |
| Water | l/m³ | 198 | 192 | 206 | 215 | 220 | x. This mix attained a strength of 160 kg/cm² (2277 p.s.i.) after 24 hours

| Proportion of bloated clay aggregate in % of total aggregates | 75 | 66 | 60 55 | 50 |
|---|---|---|---|---|
| Proportion of sand | 12 | 18 | 22 26 | 28 |
| Proportion of crushed brick 0–2 mm | 8 | 9 | 8 9 | 10 |
| Proportion of crushed brick 2–5 mm | 5 | 7 | 10 10 | 12 |

It goes without saying, however, that the invention is by no means limited to the given examples which have been discussed above; quite to the contrary, the invention can be modified and developed in many ways within the scope of its basic concept.

The invention also comprises processes for production of the building material, and in this respect the best mixes and the best properties of the building material can be obtained, if the driest possible brick-flour and crushed-brick dosages, premixed with the cement, are admixed to the moistened bloated clay aggregate, and the water balance added only after thorough mixing of these ingredients for about 2 minutes.

For determining the most favorable proportioning of such a mix, the 10/20 and 5/10 calibers of bloated clay are initially mixed in a ratio 1:4. Sand of 0/1 caliber, brick flour, and fine crushed brick of 1/3 caliber are mixed in a volume ratio of 2:1, moreover, fine crushed brick of 3/5 caliber is mixed in the volume ratio 0.5:3 with sand of 0/1 caliber + brick flour + fine crushed brick of 1/3 caliber. Then, the bloated clay mix is blended together with the aforesaid mix of sand, brick flour and crushed brick, and this in three different volume ratios, namely 1.25:0.75; 1.00:1.00; and 0.75:1.25.

After addition of water and compaction of these three different mixes, they are weighed. The mix registering the highest weight represents the maximum attainable bulk density with the lowest voids, and, accordingly, also the lowest cement requirement for attaining high strength, i.e., the most economical mix, in which volume changes due to shrinkage or temperature influences need not be expected.

What Is Claimed Is:

1. A lightweight concrete consisting essentially of the following constituents per cubic meter:
   Portland cement in an amount of 250–360 kg,
   water in an amount of 170–180 liters, and
   the remainder being aggregates constituted by
   bloated clay having a grain size of 5 to 20 mm in an amount of 700–1,000 liters and representing 50–75 percent by volume of the total aggregates,
   fine sand having a grain size of less than 1 mm in an amount between 12 and 28 percent by volume of the aggregates, and
   crushed brick having a grain size of less than 5 mm in an amount between 13 and 22 percent by volume of the aggregate.

* * * * *